July 1, 1941.  T. V. DAHLGREN ET AL  2,247,990
BURNER FOR FINELY DISTRIBUTED FUEL
Filed Sept. 1, 1938

Inventors
Theodor Victor Dahlgren
and
Sivan Julius Carlstedt
per J. Freidman
Attorney.

Patented July 1, 1941

2,247,990

UNITED STATES PATENT OFFICE 2,247,990

BURNER FOR FINELY DISTRIBUTED FUEL

Teodor Viktor Dahlgren, Djursholm, and Sivan Julius Carlstedt, Stockholm, Sweden Application September 1, 1938, Serial No. 227,948
In Sweden June 4, 1938

2 Claims. (Cl. 299—140)

The present invention relates to an improved burner for finely distributed, liquid fuel, i. e. such burners in which a liquid jet is finely distributed by means of an air or gas current.

Various constructions of such burners are known, but due to the small dimensions of the fuel and gas channels they have hitherto required rather expensive production processes and fitting works.

According to the present invention these drawbacks are eliminated by providing the air channel or channels in the mantle of a hollow cone inserted in a conical recess opening into a mixing chamber, the hollow space of the said cone being connected with the fuel in a fuel container standing under pressure as well as with the air channel or channels respectively, which in their turn are connected with a compressed container with compressed air or gas respectively.

The invention can be applied in preheaters for burners for vaporized fuel as well as in the main burner itself.

An example of the application of the invention in preheaters for burners for vaporized fuel is illustrated in the accompanying drawing.

Figure 1:
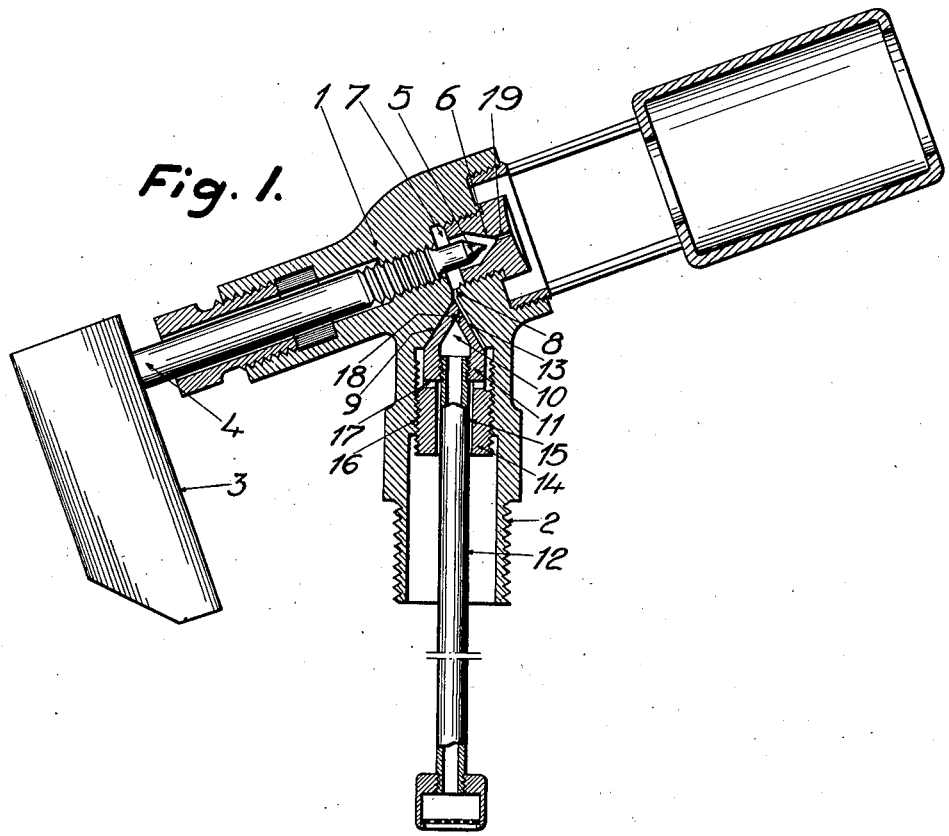
Figure 1 is a section through the preheater.

In the drawing the reference numeral 1 indicates a valve box provided with threads 2 for screwing the box into a correspondingly threaded pipe socket on a fuel container not shown, which in a way known per se can be put under pressure. In the valve box 1 there is inserted a valve rod 4 adapted to be turned with a handle 3, the said valve rod being provided with a valve cone 5 which in a known way cooperates with a valve seat 6. Into an annular chamber 7 between the valve rod and the valve box there opens a channel 8 from a conical recess 9 in which fits a conical end piece 11 on a fuel rising-pipe 12, the said end piece being provided with an inner hollow space 10, the lower end of the fuel rising-pipe extending into the fuel of the fuel container not shown.

Figure 2:
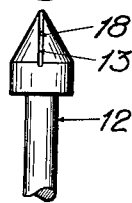
Figures 2 and 3 show details of different embodiments.

In the conical surface of the end piece 11 there are one (Figures 1 and 2) or several (Figure 3) grooves 13 extending in the direction of the generatrix and connected with the channel 8. The end piece 11 is held in its position with its conical surface against the surface of the conical recess 9 by an externally threaded ring 14 which with some space 15 surrounds the rising-pipe 12 and engages female threads 16 in the valve box.

At its end surface resting against the end piece the ring 14 is provided with grooves 17 which admit air to pass. Thus, the air can pass from the space above the fuel in the fuel container through the space 15, the grooves 17, the groove 13 and the channel 8 into the mixing chamber 7.

Figure 3:
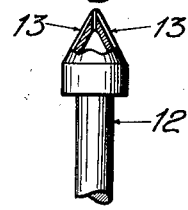

In the end piece 11 there are from the hollow space 10, which is connected with the rising-pipe 12, made one or several apertures 18 which extend to the groove 13, either at some distance from the point of the cone (Figures 1 and 2) or in the point of the cone (Figure 3).

Thus, the fuel can pass from the fuel container through the rising-pipe 12, the hollow space 10, the aperture 18, the groove 13, where it is finely distributed by the air, and the channel 8 into the mixing chamber 7. From here the fuel air mixture flows through the valve 5, 6 and the outflow opening 19 connected therewith, where it is ignited.

Having now described our invention, what we claim as new and desire to secure by Letters Patent is:

1. In a fuel atomizer for vaporized fuel supplied under pressure, a body, a mixing chamber and a conical recess in said body, a bore at the point of said conical recess connecting said recess with said mixing chamber, fuel feeding means, said fuel feeding means provided with a hollow end piece, said end piece having a conical outer surface corresponding in shape with and tightly fitting inserted in said conical recess, at least one groove in the conical surface of said end piece extending in the direction of the generatrix to the apex of said conical surface, means for feeding compressed air or gas to said groove, and an aperture in the wall of said hollow end piece, said aperture provided at the apex of said conical outer surface connecting the inner hollow part of said end piece with said groove, the geometrical axis of said aperture forming an acute angle with the respective groove, the point of said acute angle being directed towards the point of said conical surface.

2. In a fuel atomizer for vaporized fuel supplied under pressure, a body, a mixing chamber and a conical recess in said body, a bore at the point of said conical recess connecting said recess with said mixing chamber, fuel feeding means, said fuel feeding means provided with a hollow end piece, said end piece having a conical outer surface corresponding in shape with and tightly fitting inserted in said conical recess, at least one groove in the conical surface of said end piece extending in the direction of the generatrix to the apex of said conical surface, means for feeding compressed air or gas to said groove, and at least one aperture in the wall of said hollow end piece provided in said groove connecting the inner hollow part of said end piece with said groove, the geometrical axis of each of said apertures forming an acute angle with the respective groove, the point of said acute angle being directed towards the point of said conical surface.

TEODOR VIKTOR DAHLGREN.
SIVAN JULIUS CARLSTEDT.